United States Patent
Shen et al.

(10) Patent No.: US 9,846,603 B2
(45) Date of Patent: Dec. 19, 2017

(54) SYSTEM AND METHOD FOR SUPPORTING AN ADAPTIVE SELF-TUNING LOCKING MECHANISM IN A TRANSACTIONAL MIDDLEWARE MACHINE ENVIRONMENT

(71) Applicant: Oracle International Corporation, Redwood Shores, CA (US)

(72) Inventors: Xugang Shen, Beijing (CN); Qingsheng Zhang, Beijing (CN); Yongshun Jin, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 247 days.

(21) Appl. No.: 14/309,328

(22) Filed: Jun. 19, 2014

(65) Prior Publication Data
US 2015/0317191 A1 Nov. 5, 2015

Related U.S. Application Data (63) Continuation of application No. PCT/CN2014/076594, filed on Apr. 30, 2014.

(51) Int. Cl.
*G06F 12/00* (2006.01)
*G06F 12/14* (2006.01)
(Continued)

(52) U.S. Cl.
CPC ............... *G06F 9/52* (2013.01); *G06F 9/526* (2013.01); *G06F 11/073* (2013.01);
(Continued)

(58) Field of Classification Search
CPC ............... G06F 9/526; G06F 17/30362; G06F 17/30171
(Continued)

(56) References Cited

U.S. PATENT DOCUMENTS 5,295,262 A * 3/1994 Seigh, II .................... G06F 9/52
6,119,115 A * 9/2000 Barr ......................... G06F 9/526
(Continued)

FOREIGN PATENT DOCUMENTS

CN 1610906 4/2005
CN 101256509 A 3/2008
(Continued)

OTHER PUBLICATIONS

State Intellectual Property Office of the P.R. China (ISA/CN) International Search Report and Written Opinion dated Jan. 28, 2015 for International Application No. PCT/CN2014/076594, 13 pages.
(Continued)

*Primary Examiner* — Faisal M Zaman
(74) *Attorney, Agent, or Firm* — Tucker Ellis LLP (57) ABSTRACT

A system and method can support an adaptive self-tuning locking mechanism in a transactional middleware machine environment. The system allows each process in a plurality of processes to perform one or more test-and-set (TAS) operations in order to obtain a lock for data in a shared memory. Then, the system can obtain a spin failed rate for a current tuning period, wherein a spin failure happens when a process fails to obtain the lock after performing a maximum number of rounds of TAS operations that are allowed. Furthermore, the system can adaptively configuring a spin count for a next tuning period based on the obtained spin failure rate, wherein the spin count specifies the maximum number of rounds of TAS operations that are allowed for the next tuning period.

20 Claims, 8 Drawing Sheets

(51) Int. Cl.
*G06F 17/00* (2006.01)
*G06F 7/00* (2006.01)
*G06F 9/52* (2006.01)
*G06F 11/07* (2006.01)
*G06F 11/34* (2006.01)

(52) U.S. Cl.
CPC ...... *G06F 11/0784* (2013.01); *G06F 11/0793* (2013.01); *G06F 11/34* (2013.01)

(58) Field of Classification Search
USPC .......... 710/200; 711/147, 152; 707/E17.007, 707/704, 690, 999.008
See application file for complete search history.

(56) References Cited

U.S. PATENT DOCUMENTS

| | | | |
|---|---|---|---|
| 6,549,961 | B1 | 4/2003 | Kloth |
| 6,578,033 | B1* | 6/2003 | Singhal et al. |
| 6,687,904 | B1* | 2/2004 | Gomes et al. ................ 718/102 |
| 7,051,026 | B2* | 5/2006 | Berry et al. |
| 7,594,234 | B1 | 9/2009 | Dice |
| 8,392,925 | B2* | 3/2013 | Ramesh ................ G06F 9/526 |
| | | | 718/102 |
| 8,782,352 | B2* | 7/2014 | Shen et al. .................... 711/152 |
| 8,914,588 | B2* | 12/2014 | Shen et al. .................... 711/152 |
| 2003/0182356 | A1* | 9/2003 | Limoges et al. ............. 709/108 |
| 2009/0328053 | A1* | 12/2009 | Dice ............................. 718/104 |
| 2010/0005467 | A1* | 1/2010 | Shpeisman ............... G06F 9/52 |
| | | | 718/100 |
| 2010/0088702 | A1 | 4/2010 | Dern et al. |
| 2010/0332769 | A1 | 12/2010 | Martin |
| 2011/0137879 | A1* | 6/2011 | Dubey ............. G06F 17/30171 |
| | | | 707/704 |
| 2012/0198111 | A1* | 8/2012 | Siegwart ................. G06F 12/00 |
| | | | 710/200 |
| 2013/0086333 | A1* | 4/2013 | Shen ................... G06F 12/1466 |
| | | | 711/152 |
| 2014/0108728 | A1* | 4/2014 | Nguyen ........................ 711/118 |
| 2014/0310438 | A1* | 10/2014 | Richardson ............ G06F 9/526 |
| | | | 710/200 |

FOREIGN PATENT DOCUMENTS

| | | |
|---|---|---|
| CN | 101546275 | 9/2009 |
| JP | H08328933 | 12/1996 |
| WO | 2013048826 | 4/2013 |

OTHER PUBLICATIONS

Search Report from State Intellectual Property Office of the People's Republic of China for Application No. 201280047496.7 dated Sep. 1, 2015, 2 pages.

Tsushima Hiroki, 'Oracle Setting Tips on the UNIX Platform', DB Magazine, Apr. 1, 2001, pp. 81-101, vol. 10, No. 16, Shoeisha Co., Ltd., Japan.

* cited by examiner

SYSTEM AND METHOD FOR SUPPORTING AN ADAPTIVE SELF-TUNING LOCKING MECHANISM IN A TRANSACTIONAL MIDDLEWARE MACHINE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application is a continuation of International Application No. PCT/CN2014/076594, filed Apr. 30, 2014, entitled "SYSTEM AND METHOD FOR SUPPORTING AN ADAPTIVE SELF-TUNING LOCKING MECHANISM IN A TRANSACTIONAL MIDDLEWARE MACHINE ENVIRONMENT".

CROSS REFERENCE TO RELATED APPLICATIONS

This application is related to the following patent application, which is hereby incorporated by reference in its entirety:

U.S. patent application Ser. No. 13/414,593, filed Mar. 7, 2012, and now U.S. Pat. No. 8,782,352, entitled "SYSTEM AND METHOD FOR SUPPORTING A SELF-TUNING LOCKING MECHANISM IN A TRANSACTIONAL MIDDLEWARE MACHINE ENVIRONMENT".

FIELD OF INVENTION

The present invention is generally related to computer systems and software such as middleware, and is particularly related to supporting a transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of the transactional middleware. These are the generally areas that embodiments of the invention are intended to address.

SUMMARY

Described herein are systems and methods that can support an adaptive self-tuning locking mechanism in a transactional middleware machine environment. The system allows each process in a plurality of processes to perform one or more test-and-set (TAS) operations in order to obtain a lock for data in a shared memory. Then, the system can obtain a spin failed rate for a current tuning period, wherein a spin failure happens when a process fails to obtain the lock after performing a maximum number of rounds of TAS operations that are allowed. Furthermore, the system can adaptively configuring a spin count for a next tuning period based on the obtained spin failure rate, wherein the spin count specifies the maximum number of rounds of TAS operations that are allowed for the next tuning period.

DETAILED DESCRIPTION

Described herein is a system and method for supporting an adaptive self-tuning locking mechanism in a transactional middleware machine environment.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

In accordance with an embodiment of the invention, a transactional middleware system, such as a Tuxedo system, can take advantage of fast machines with multiple processors, such as an Exalogic middleware machine, and a high performance network connection, such as an Infiniband (IB) network.

Lock Mechanisms

Figure 1:
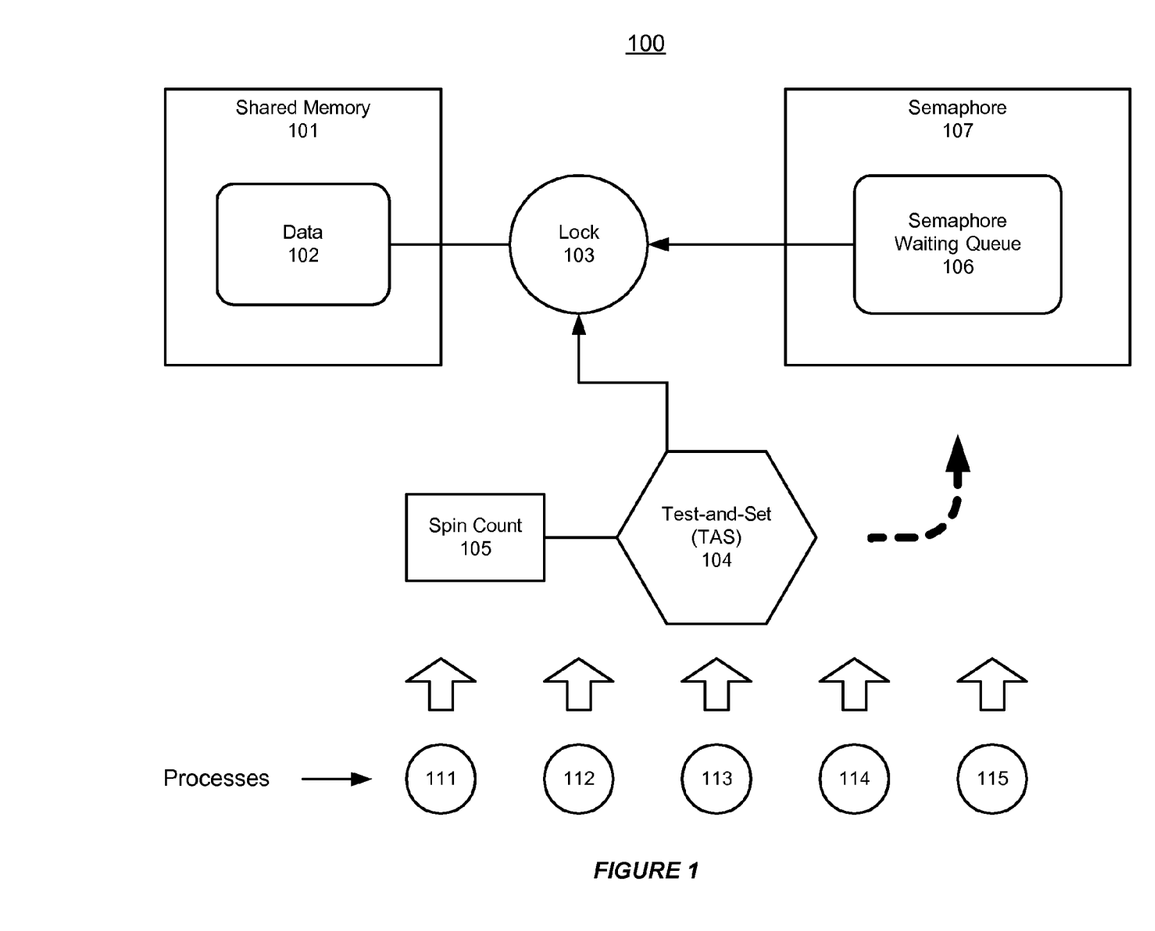
FIG. 1 shows an illustration of a transactional middleware machine environment that supports a lock mechanism, in accordance with an embodiment of the invention.

FIG. 1 shows an illustration of a transactional middleware machine environment that supports a lock mechanism, in accordance with an embodiment of the invention. As shown in FIG. 1, a transactional middleware environment 100 can employ a lock mechanism 103 for protecting various transaction data 102 in a shared memory 101, e.g. the bulletin board (BB) in the Tuxedo environment, when there are concurrent transactions (i.e. on processes 111-115).

In accordance with an embodiment of the invention, the transactional middleware environment 100 can take advantage of the multi-processor machines by using an atomic TAS (Test-And-Set) 104 assembly component for implementing an effective locking mechanism. Additionally, a process in a transactional application can use a semaphore mechanism 107 that is provided by the operating system (OS) to obtain a lock on data 102, if necessary.

For example, when a process 111 wants to get a lock on data 102, the process 111 can perform a TAS operation for a number of rounds. The system can specify a spin count 105, which is the maximum number of rounds of TAS operation that are allowed.

As shown in FIG. 1, if the lock 103 becomes available before the spin count 105 is reached, the process 111 can obtain the lock 103 with much less cost than the semaphore 107 mechanism provided by the OS.

Otherwise, if the lock 103 is not available after the process 111 has performed the maximum number of rounds of TAS operations that are allowed, the process 111 can block on the semaphore 107 and can wait until a lock owner releases the lock 103. For example, the lock requests blocking on the semaphore 107 can be put into a queue, e.g. a semaphore waiting queue 106.

Additionally, the lock requests blocking on the semaphore 107 can have a higher priority than the lock requests that are based on the TAS assembly component 104. Thus, the lock holder will first release the lock 103 to a process in the semaphore waiting queue 106 as long as the semaphore waiting queue 106 is not empty.

Adaptive Self-Tuning Lock Mechanism

Figure 2:
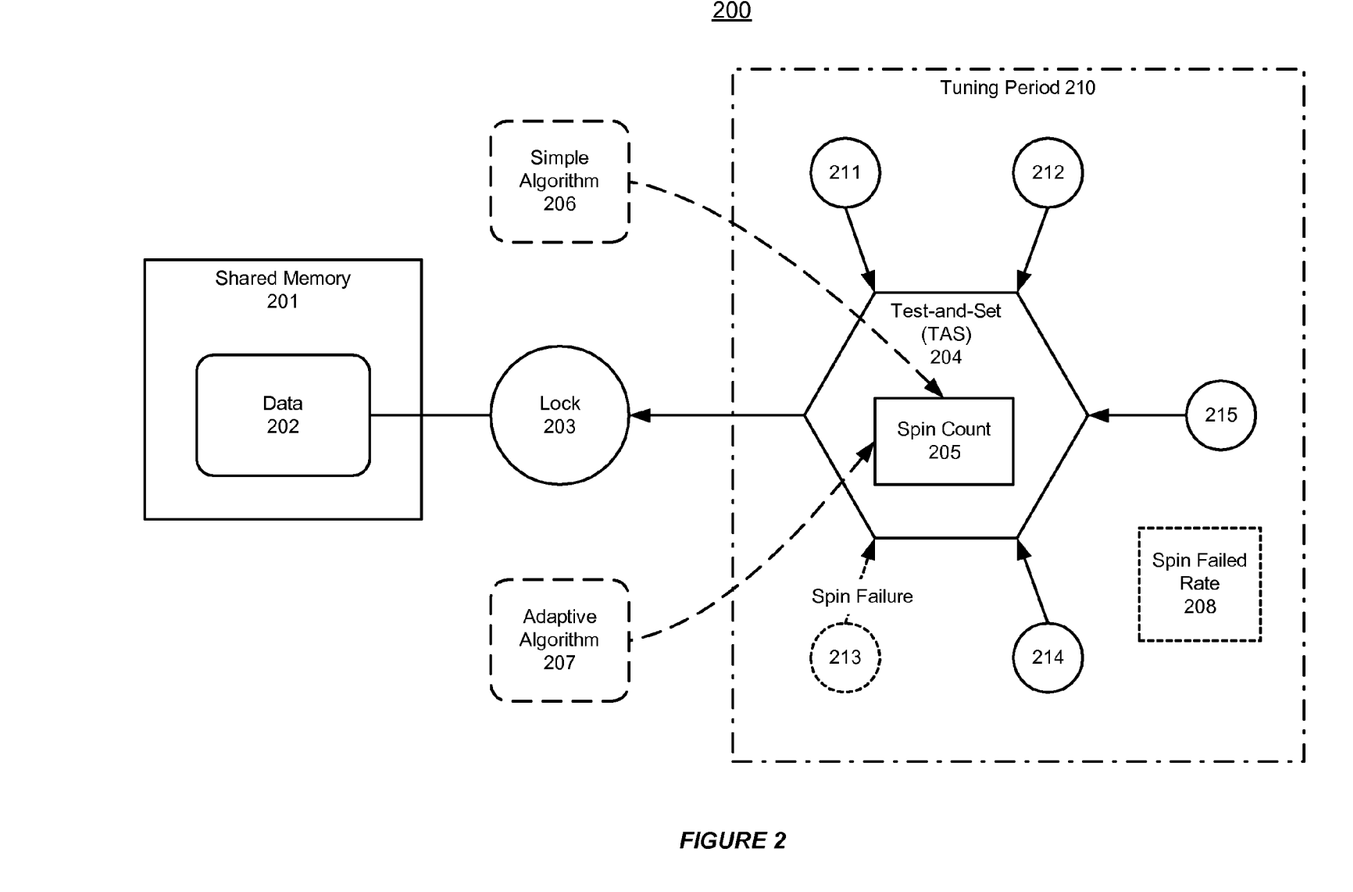
FIG. 2 shows an illustration of supporting an adaptive self-tuning lock mechanism in a transactional middleware machine environment, in accordance with an embodiment of the invention.

FIG. 2 shows an illustration of supporting an adaptive self-tuning lock mechanism in a transactional middleware machine environment, in accordance with an embodiment of the invention. As shown in FIG. 2, a transactional middleware environment 200 can employ a lock mechanism 203 for protecting various transaction data 202 in a shared memory 201, when there are concurrent transactions (i.e. on processes 211-215).

For example, when the processes 211-215 want to get a lock 203 on data 202, each of the process 211-215 can perform a TAS 204 operation for a number of rounds. The system can specify a spin count 205, which is the maximum number of rounds of TAS operations that are allowed. In accordance with an embodiment of the invention, metadata, such as a SPINCOUNT parameter in the Tuxedo configuration file, can be used to specify a default value and/or an initial value for the spin count 205.

As shown in FIG. 2, if the lock 203 becomes available before the spin count 205 is reached, a process (e.g. one of the processes 211-212 and 214-215) can obtain the lock 203 with much less cost than the semaphore mechanism provided by the OS.

Otherwise, if the lock 203 is not available before the spin count 205 is reached (i.e. a spin failure happens), then a process (e.g. the process 213) can be configured to block on the semaphore, and wait until the lock owner releases the lock 203 and wakes it up.

Furthermore, the spin count value 205 can be stored in the shared memory 201. A special process, such as a Tuxedo daemon process, can periodically tune (or change) the spin count value 205 according to operation information collected in the previous tuning period. For example, the Tuxedo daemon can update the target spin count value once every five seconds by default.

In accordance with one embodiment, different algorithms can be used to calculate and configure the spin count 205 value. For example, when the CPU idle ratio for the current tuning period is sufficient, a simple algorithm 206 can increase the spin count 205 value, if the spin failed rate 208 is higher than the target (i.e. too many TAS 204 operations have failed to obtain the lock 203 in the current tuning period and have switched to the semaphore). Furthermore, the simple algorithm can decrease the spin count 205 value if the CPU idle ratio is too high.

While the simple algorithm 206 is easy to implement, the simple algorithm 206 may encounter different problems when it runs on a real resource manager (RM), e.g. an Oracle database. For example, the simple algorithm 206 may generate an extreme large spin count value 205, since the simple algorithm 206 will increase the spin count value 205 as long as the spin failed ratio is sub-standard. Also, the simple algorithm 206 may not be able to fine tune the spin count value 205, since the step taken by the simple algorithm 206 to increase the spin count value 205 tends to be too big and the spin count value 205 may reach the top limitation in a few rounds of tuning. Additionally, the simple algorithm 206 may generate a large spin count value 205, which actually cause a worse throughput in the system when running on a real RM. Furthermore, the simple algorithm 206 may not decrease the spin count value 205 when the idle CPU ratio is high enough. Moreover, it can be difficult for the simple algorithm 206 to configure the default original spin count value 205 and the default target of spin failed rate 208 accordingly to the real RM environment.

Alternatively, the system can employ an adaptive algorithm 207 to dynamically calculate the spin count 205 value in real time. The adaptive algorithm 207 can avoid various problems that may occur when the system runs on a real resource manager (RM), e.g. an Oracle database, using the simple algorithm 206.

In accordance with an embodiment of the invention, the adaptive algorithm 207 can prevent bad tuning by keeping good tuning. For example, the adaptive algorithm 207 can store a spin count value 205 and a spin failed rate 208 from a last good tuning period.

For each tuning period 210, the system can check whether the current spin failed rate 208 is better than the stored last good spin failed ratio. If the current spin failed rate 208 is better than the last good spin failed ratio, the system can consider the current tuning period 210 as a good tuning. Then, the system can cache the current spin count value 205 and the current spin failed rate 208. On the other hand, if the current spin failed rate increases (i.e. becomes worse) after a tuning, the system can use the stored last good spin count value 205 for the next tuning period 210.

Thus, transactional middleware environment 200 can support massive concurrent transactions scenarios and achieve high throughput.

Figure 3:
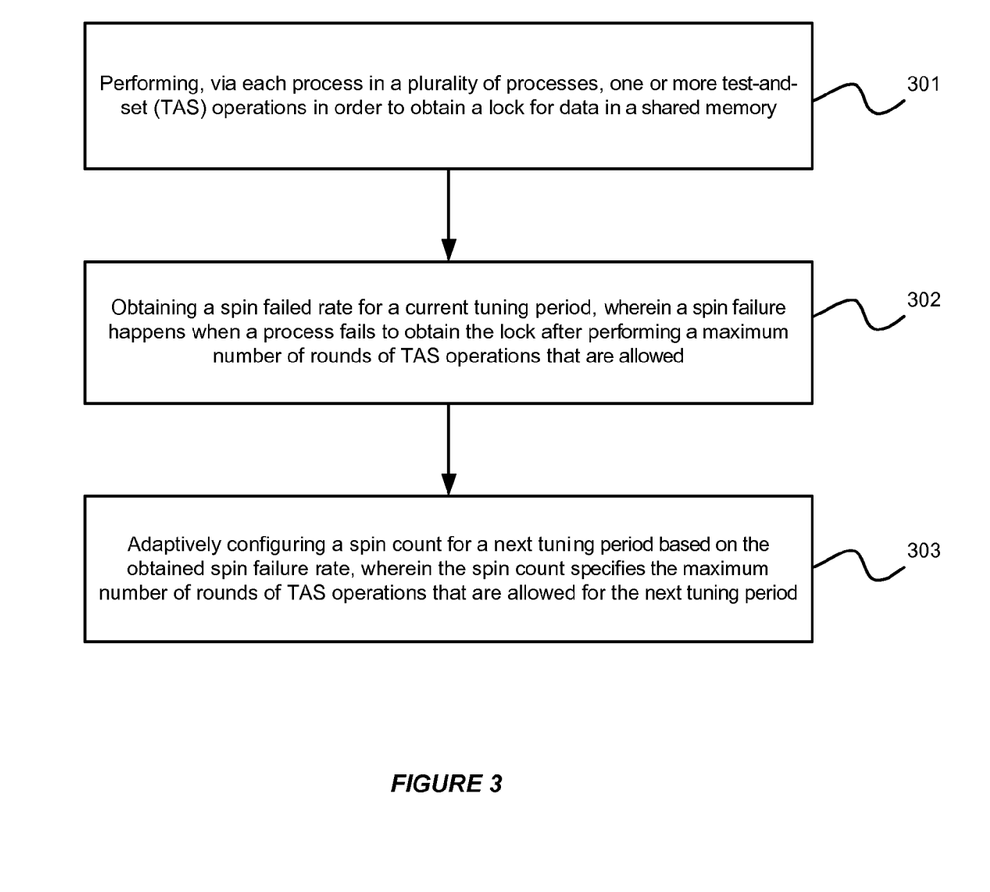
FIG. 3 illustrates an exemplary flow chart for supporting an adaptive self-tuning lock mechanism in a transactional middleware machine environment, in accordance with an embodiment of the invention.

FIG. 3 illustrates an exemplary flow chart for supporting an adaptive self-tuning lock mechanism in a transactional middleware machine environment, in accordance with an embodiment of the invention. As shown in FIG. 3, at step 301, each process can perform one or more test-and-set (TAS) operations in order to obtain a lock for data in a shared memory. Additionally, at step 302, the system can obtain a spin failed rate for a current tuning period, wherein a spin failure happens when a process fails to obtain the lock after performing a maximum number of rounds of TAS operations that are allowed. Furthermore, at step 303, the system can adaptively configure the spin count value for a next tuning period based on the obtained spin failure rate, wherein the spin count specifies the maximum number of rounds of TAS operations that are allowed for the next tuning period.

Adaptive Algorithm to Dynamically Calculate the Target Spin Count Value

In accordance with an embodiment of the invention, the system can use an adaptive algorithm to dynamically determine the target spin count value in real time. Also, the system can calculate the target spin count value in the context of the hardware configuration and the application scenario.

For example, in the Tuxedo environment, the system can calculate the spin count value by calling a function as shown in the following.

static int_calc_spintuning(_TCADEF)

In Tuxedo, an application can call the above function in each tuning period, such as in each scan unit (which can be configured using the parameter SCANUNIT in the RESOURCE section).

Additionally, as shown in the following, the system can call another function, which is responsible for retrieving the CPU ratios.

static int getCPUrate(int type,float*rate,int size)

The implementation for the above function can be platform-dependent. For example, the above function can obtain the CPU ratios via system tools, such as the file/proc/stat tools in the Exalogic Elastic Cloud (Linux 64 bit) platform. Alternatively, the above function can obtain the CPU ratios via system libraries, such as the kstat library In the SPARC SuperCluster (Sparc 64 bit) platform.

Figure 4:
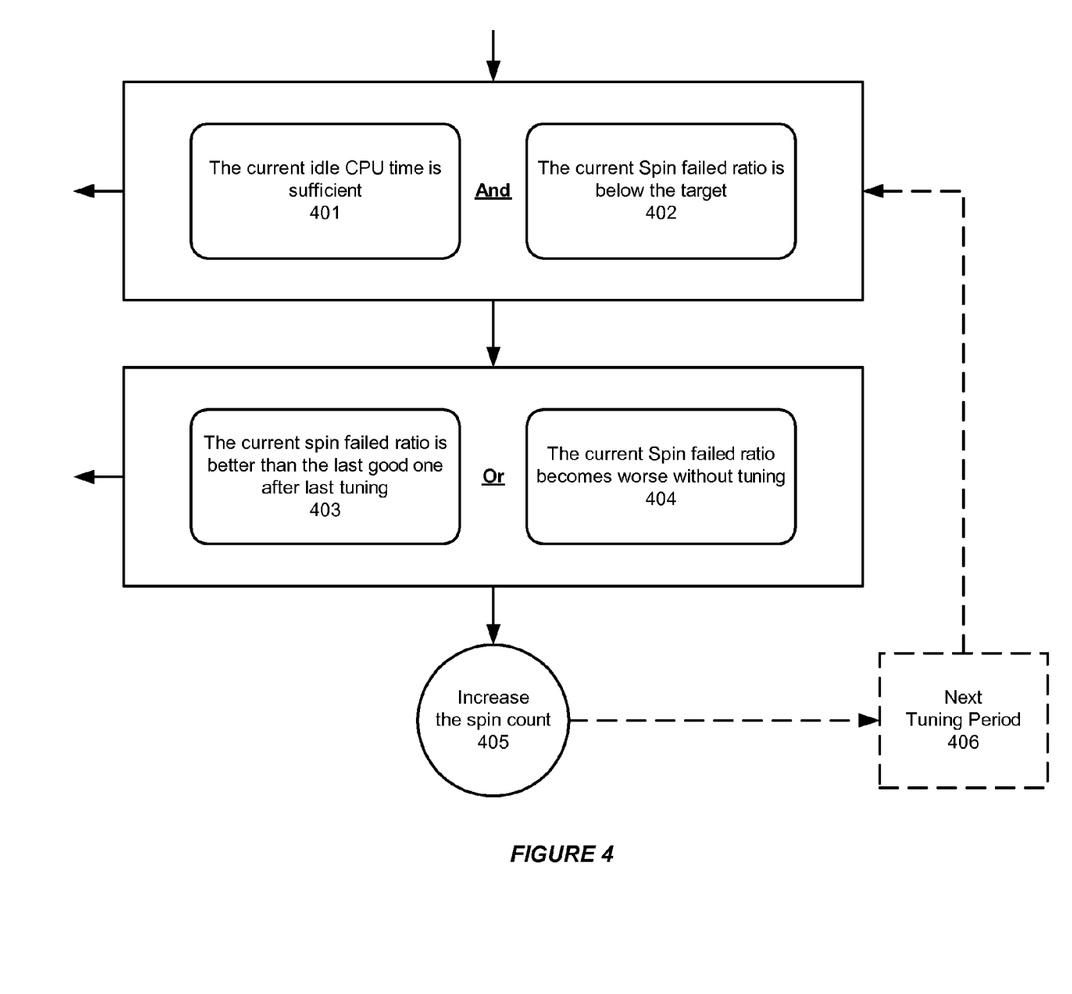
FIG. 4 shows an illustration of dynamically increasing the spin count value in a transactional middleware machine environment that supports an adaptive self-tuning lock mechanism, in accordance with an embodiment of the invention.

FIG. 4 shows an illustration of dynamically increasing the spin count value in a transactional middleware machine environment that supports an adaptive self-tuning lock mechanism, in accordance with an embodiment of the invention. As shown in FIG. 4, the adaptive algorithm can dynamically increase the spin count when it is appropriate.

At step 401, the system can check whether the current idle CPU is sufficient, i.e. whether an idle CPU rate for the current tuning period is more than a user-configured minimum idle CPU rate. Also, at step 402, the system can check whether the current spin failed ratio is below a user-configured target.

Then, the adaptive algorithm may decide not to increase the spin count, when either the current idle CPU is not sufficient or the current spin failed ratio for the current tuning period already meets the user-configured target.

Otherwise, at step 403, the adaptive algorithm can check whether the current spin failed ratio is better than the stored last good spin failed ratio. Also, at step 404, the adaptive algorithm can check whether the current spin failed ratio becomes worse without tuning.

As a result, at step 405, the system can increase the spin count, if the spin failed ratio for the current tuning period is less than the last good spin failed ratio, or if the spin failed ratio for the current tuning period becomes worse without tuning.

Finally, at step 406, the system can proceed to the next tuning period, which can lead the process back to repeat the above steps 401-405 for the next tuning period.

In Tuxedo, the system can use the following algorithm to determine the increase of the spin count (i.e. calculating the tuned SPINCOUNT for the next tuning period).

Tuned SPINCOUNT+=(SPINCOUNT*base_factor)
*min(max_times,(idle CPU ratio/user CPU ratio))

The above algorithm uses two factors to fine tune the increase of the SPINCOUNT, which depends on the current SPINCOUNT value and the value of idle CPU ratio/user CPU ratio. The first factor, base_factor, which can be used to reduce the contribution of the current SPINCOUNT, is smaller than 1. The second factor, max_times, can be used as the top limitation of idle CPU ratio/user CPU ratio.

Additionally, the range of possible SPINCOUNT values can be divided into several intervals. The following Table 1 shows an exemplary division of several intervals.

TABLE 1

| SPINCOUNT interval | [bottom limitation, 8*1024) | [8*1024, 64*1024) | [64*1024, 512*1024) | [512*1024, top limitation) |
|---|---|---|---|---|
| Base_factor | 1.0 | 0.75 | 0.5 | 0.25 |
| max_times | 1.0 | 1.0 | 1.0 | 1.0 |

As shown in the above Table 1, the different intervals can be configured with different base_factor and max_times values. In order to ensure that the SPINCOUNT can gradually reach the target value, the values for the base_factor and the max_times can be set to be smaller as the SPINCOUNT becomes bigger.

Figure 5:
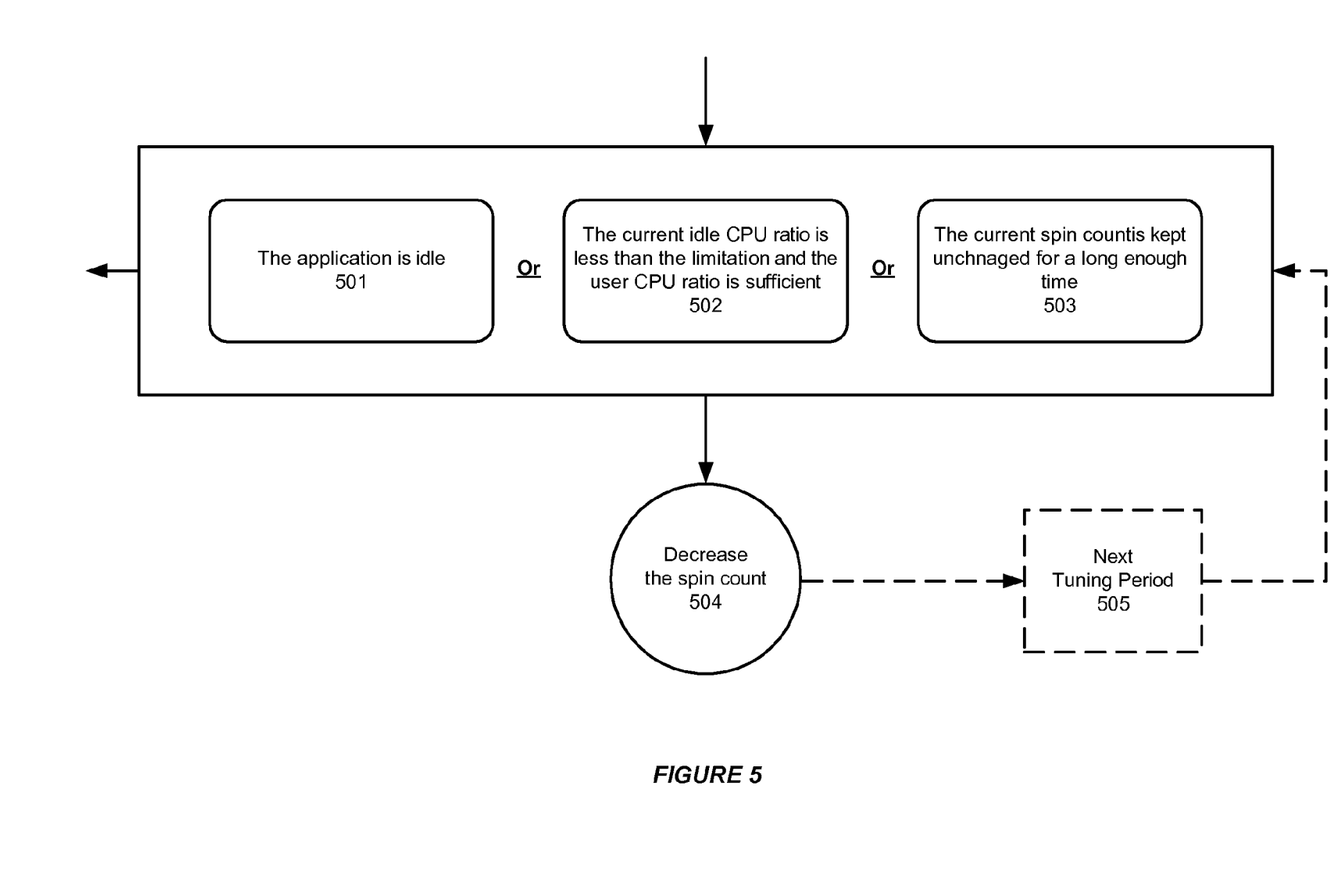
FIG. 5 shows an illustration of dynamically decreasing the spin count value in a transactional middleware machine environment that supports an adaptive self-tuning lock mechanism, in accordance with an embodiment of the invention.

FIG. 5 shows an illustration of dynamically decreasing the spin count value in a transactional middleware machine environment that supports an adaptive self-tuning lock mechanism, in accordance with an embodiment of the invention. As shown in FIG. 5, the adaptive algorithm can dynamically decrease the spin count when it is appropriate.

At step 501, the adaptive algorithm can check whether application is idle. Also, at step 502, the adaptive algorithm can check whether current idle CPU ratio is less than the limitation and the user CPU ratio is sufficient, and at step 503, the adaptive algorithm can check whether current spin count has been kept unchanged (or stable) for a period of time that is long enough.

Then, at step 504, the algorithm can decrease the spin count if the application is idle. For example, Tuxedo can use the following formula to decrease the SPINCOUNT value.

$$\text{Tuned SPINCOUNT} -= \text{Tuned SPINCOUNT} >> 3$$

Using the above algorithm, Tuxedo can bring a high SPINCOUNT value automatically back to the original SPINCOUNT value when the application becomes idle.

Also, at step 504, the algorithm can decrease the spin count if the current idle CPU ratio is less than the limitation (a user-configured minimum idle CPU rate) and the user CPU ratio is sufficient. For example, Tuxedo can use the following formula to decrease the SPINCOUNT value.

$$\text{Tuned SPINCOUNT} = \text{Tuned SPINCOUNT} >> 2$$

Additionally, at step 504, the algorithm can decrease the spin count if the current SPINCOUNT has been kept stable for a period time that is long enough. For example, Tuxedo can use the following formula to decrease the SPINCOUNT value.

$$\text{Tuned SPINCOUNT} -= \text{Tuned SPINCOUNT} >> 3$$

Using the above algorithm, Tuxedo allows the SPIN-COUNT value to be decreased after a long stable time. Thus, Tuxedo can automatically bring a high SPINCOUNT back to a proper value when the load becomes lighter.

Finally, at step 505, the system can proceed to the next tuning period, which can lead the process back to repeat the above steps 501-504 for the next tuning period.

Figure 6:
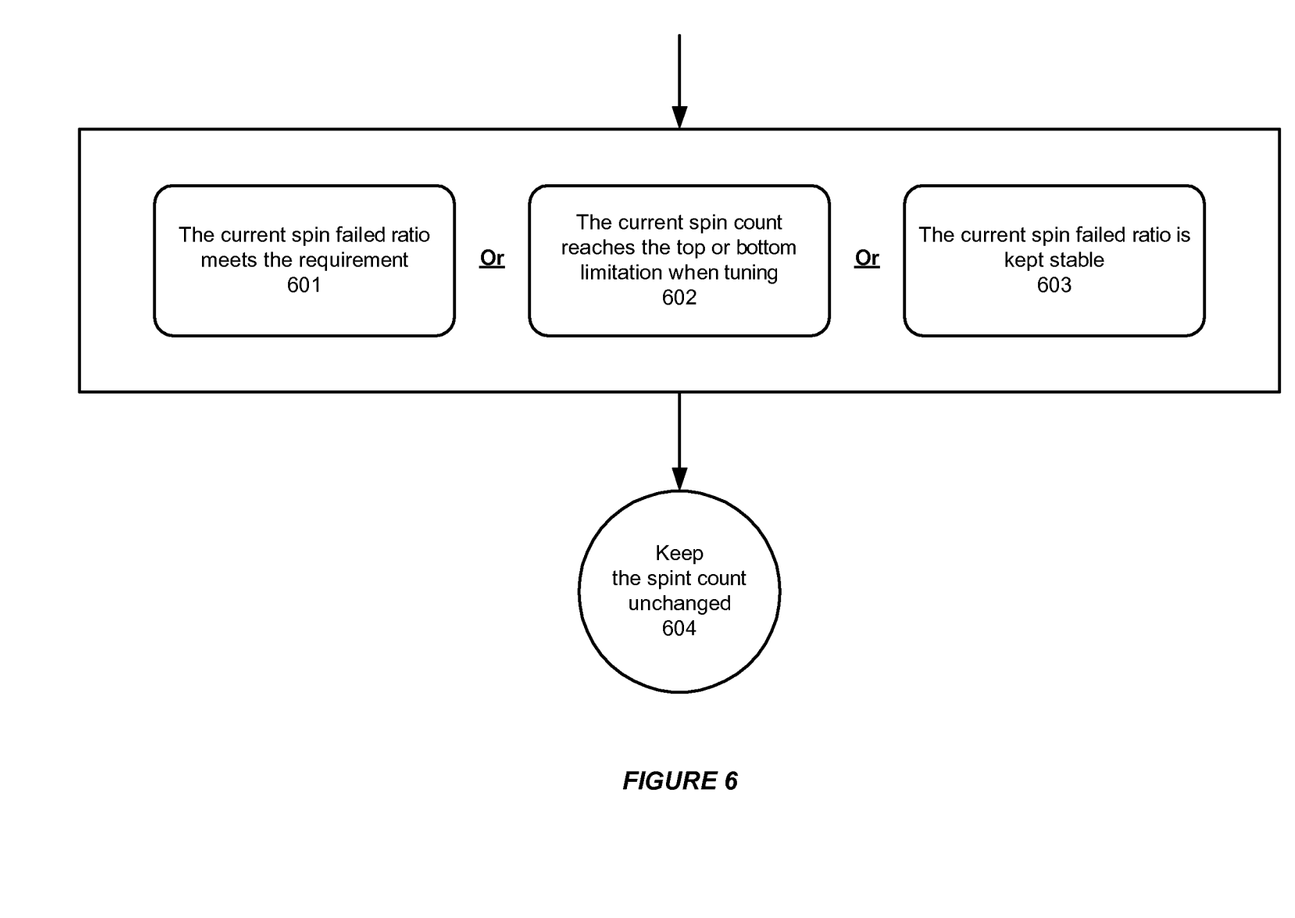
FIG. 6 shows an illustration of maintaining the spin count value unchanged in a transactional middleware machine environment that supports an adaptive self-tuning lock mechanism, in accordance with an embodiment of the invention.

FIG. 6 shows an illustration of maintaining the spin count value unchanged in a transactional middleware machine environment that supports an adaptive self-tuning lock mechanism, in accordance with an embodiment of the invention. As shown in FIG. 6, the adaptive algorithm can maintain the spin count unchanged in different scenarios.

At step 601, the adaptive algorithm can check whether the current spin failed ratio meets the requirement. Also, at step 602, the adaptive algorithm can check whether the current spin count reaches the top or bottom limitation when tuning, and at step 603, the adaptive algorithm can check whether the current spin failed ratio is kept stable.

Then, at step 604, the algorithm can keep the spin count unchanged if the current spin failed ratio meets the requirement, or if the current SPINCOUNT reaches the top or bottom limitation when tuning, or if the current spin failed ratio is kept stable.

Configuring the Spin Count with Load Surge Protection

Figure 7:
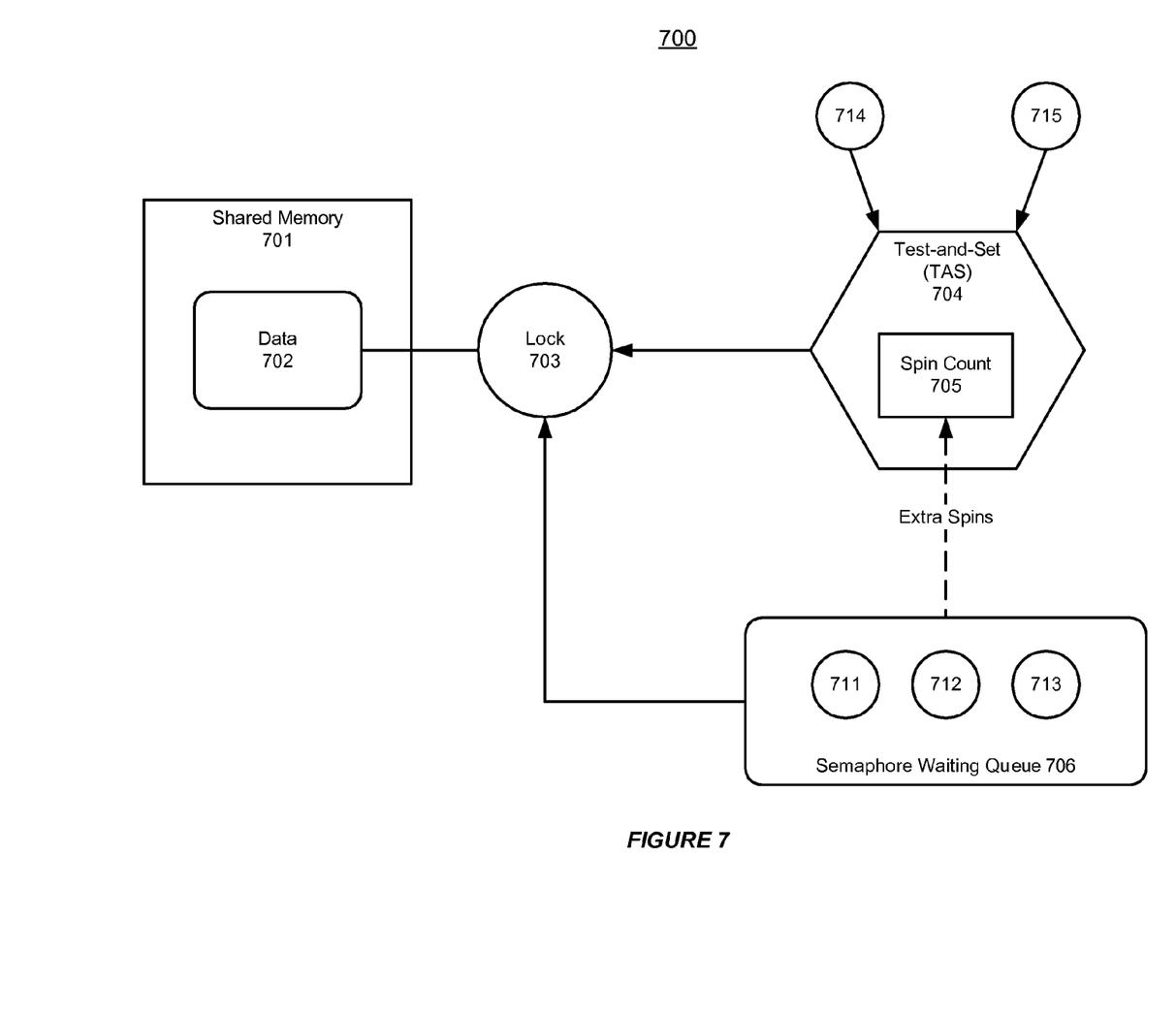
FIG. 7 shows an illustration of configuring spin count with load surge protection in a transactional middleware machine environment that supports an adaptive self-tuning lock mechanism, in accordance with an embodiment of the invention.

FIG. 7 shows an illustration of configuring spin count with load surge protection in a transactional middleware machine environment that supports an adaptive self-tuning lock mechanism, in accordance with an embodiment of the invention. As shown in FIG. 7, a transactional middleware environment 700 can employ a lock 703 for protecting various transaction data 702 in a shared memory 701, when there are concurrent transactions (i.e. on processes 711-715).

Furthermore, the transactional middleware environment 700 can use an atomic TAS (Test-And-Set) 704 assembly component to implement an effective locking mechanism. Additionally, the system can put a process (e.g. the processes 711-713) in a semaphore waiting queue 706, when a spin failure happens.

As shown in FIG. 7, the lock requests by the processes 711-713, which wait in the semaphore waiting queue 706, can have a higher priority than the lock requests by the processes 714-715, which are based on the TAS assembly component 704.

Thus, a lock holder may first release the lock 703 to the processes 711-713 in the semaphore waiting queue 706, and the processes 714-715 may not have access to the lock 703 as long as the semaphore waiting queue 706 is not empty.

In accordance with an embodiment of the invention, the system can dynamically determine the spin count value in real time, since the length of the semaphore waiting queue 706 may vary from time to time.

As shown in FIG. 7, the system can apply extra spins on the processes 714-715, which use the TAS assembly component 704. For example, in Tuxedo, the system can use the following algorithm to determine the actual used spin count (i.e. the used SPINCOUNT) in real time.

$$\text{Used SPINCOUNT} = \text{Tuned SPINCOUNT} + \text{extraspin} * \text{depth of the semaphore waiting queue}$$

As shown in the above, when calculating the used SPIN-COUNT, Tuxedo can take into account of the current depth of the semaphore waiting queue. The deeper the semaphore waiting queue is, the bigger the used SPINCOUNT can be set.

In accordance with an embodiment of the invention, when a load surge occurs in the transactional middleware machine environment 700, there can be a sudden increase of spin failures at the TAS assembly component 704, which may lead to more processes waiting for the lock 703 in the semaphore waiting queue 706.

By applying extra spins on the processes 714-715, which use the TAS assembly component 704, the system can reduce the spin failed ratio when the semaphore queue is deep. Furthermore, when the load in the system eventually becomes light, the length of the semaphore waiting queue 706 is shortened. Thus, the actual used spin count can be reduced in the real time within a tuning period.

Figure 8:
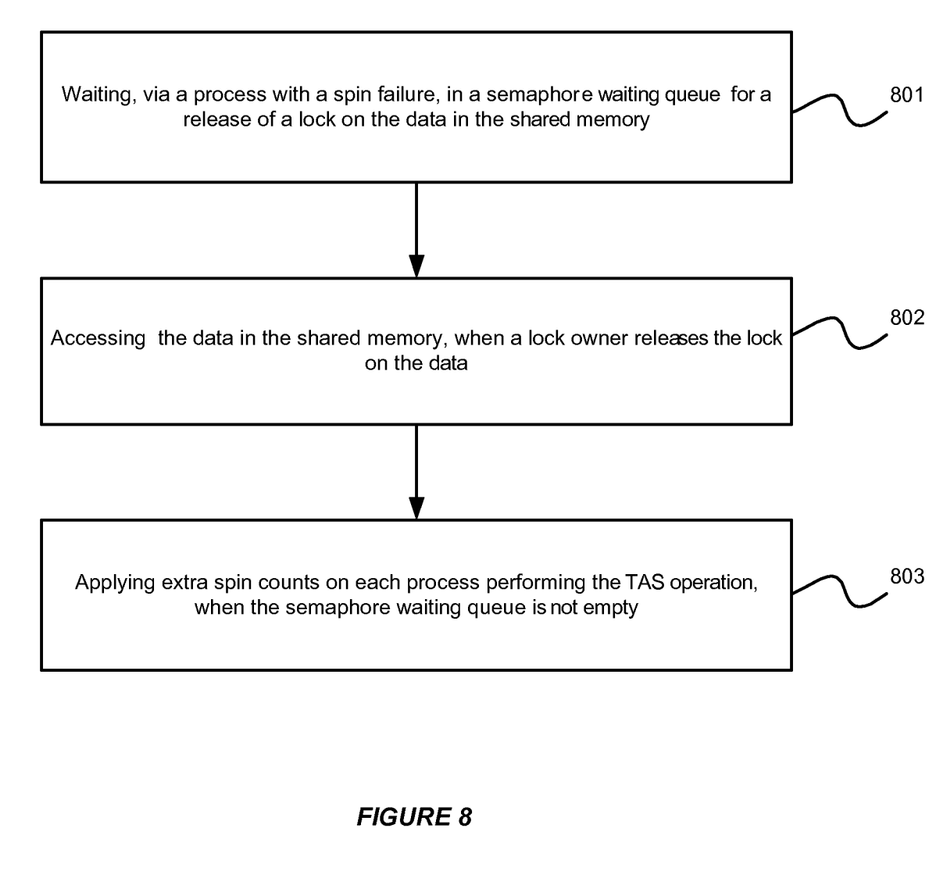
FIG. 8 illustrates an exemplary flow chart for configuring spin count with load surge protection in a transactional middleware machine environment, in accordance with an embodiment of the invention.

FIG. 8 illustrates an exemplary flow chart for configuring spin count with load surge protection in a transactional middleware machine environment, in accordance with an embodiment of the invention. As shown in FIG. 8, at step 801, a process with a spin failure can wait in a semaphore waiting queue for a release of a lock on the data in the shared memory. Then, at step 802, the process can access the data in the shared memory, when a lock owner releases the lock on the data. Furthermore, at step 803, the system can apply extra spin counts on each process performing the TAS operation, when the semaphore waiting queue is not empty.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting an adaptive locking mechanism in a transactional middleware machine environment, the method comprising:
    monitoring performing, via each process of a plurality of processes during a first tuning period and using a first spin count, test-and-set (TAS) operations in order to obtain locks for data in a shared memory, wherein the first spin count specifies a first maximum number of rounds of the TAS operations that are allowed by each process of the plurality of processes during the first tuning period;
    storing the first spin count as a last good spin count;
    obtaining a first spin failure rate for the first tuning period, wherein a first spin failure comprises a process of the plurality of processes failing to obtain a lock after performing the first maximum number of rounds of the TAS operations that are allowed to the process during the first tuning period;
    adaptively configuring a second spin count for a second tuning period after the first tuning period based on the obtained first spin failure rate, wherein the second spin count is different than the last good spin count and specifies a second maximum number of rounds of the TAS operations that are allowed by each process of the plurality of processes during the second tuning period;
    monitoring performing, via each process of the plurality of processes during the second tuning period and using the second spin count, the TAS operations in order to obtain locks for the data in the shared memory;
    obtaining a second spin failure rate for the second tuning period, wherein a second spin failure comprises a process of the plurality of processes failing to obtain a lock after performing the second maximum number of rounds of the TAS operations that are allowed to the process during the second tuning period;
    selectively configuring a next spin count for a next tuning period after the second tuning period to be the second spin count and storing the second spin count as the last good spin count responsive to the second spin failure rate being less than the first spin failure rate; and
    selectively configuring the next spin count for the next tuning period after the second tuning period to be the last good spin count responsive to the second spin failure rate being greater than the first spin failure rate.

2. The method of claim 1, further comprising:
using an assembly component to perform said TAS operations.

3. The method of claim 1, further comprising:
preconfiguring the first spin count using metadata.

4. The method of claim 1, further comprising:
determining whether an idle CPU rate for the first tuning period is more than a user-configured minimum idle CPU rate and whether the first spin failure rate for the first tuning period meets a user-configured target.

5. The method of claim 4, further comprising:
when the idle CPU rate for the first tuning period is more than the user-configured minimum idle CPU rate and the first spin failure rate for the first tuning period does not meet the user-configured target, increasing the first spin count to the second spin count:
    if the first spin failure rate for the first tuning period is better than a last good spin failure rate, or
    if the first spin failure rate for the first tuning period becomes worse without tuning.

6. The method of claim 5, further comprising:
dividing a range for possible second spin count values into several intervals, and
using a different formula to calculate a tuned spin count value in each different interval.

7. The method of claim 1, further comprising:
decreasing the first spin count to a decreased spin count as the second spin count, if at least one of
    an application is idle,
    an idle CPU ratio is less than a user-configured minimum idle CPU rate and a user CPU ratio is sufficient, and
    the first spin count has been kept stable for a predetermined period of time.

8. The method of claim 1, further comprising:
keeping the first spin count as the second spin count, if at least one of
    the second spin failure rate for the second tuning period meets a predetermined requirement,
    the second spin count for the second tuning period reaches a predetermined top or bottom spin count limitation, or
    the second spin failure rate for the second tuning period is stable.

9. The method of claim 1, further comprising:
waiting, via a first process of the plurality of processes with a spin failure, in a semaphore waiting queue for a release of a lock on the data in the shared memory; and
accessing the data in the shared memory by the first process, when a lock owner releases the lock on the data.

10. The method of claim 9, further comprising:
applying extra spin counts on each process of the plurality of processes performing the TAS operations, when the semaphore waiting queue is not empty.

11. A system for providing an adaptive locking mechanism in a transactional middleware machine environment, comprising:
    one or more processors;
    a plurality of processes, wherein each process in the plurality of processes operates to perform test-and-set (TAS) operations during a first tuning period and using a first spin count specifying a first maximum number of rounds of the TAS operations that are allowed during the first tuning period in order to obtain locks for data in a shared memory, wherein each process in the plurality of processes operates to perform the one or more test-and-set (TAS) operations in order to obtain locks for the data in the shared memory during a second tuning period after the first tuning period and using a second spin count specifying a second maximum number of rounds of the TAS operations that are allowed during the second tuning period;

a transactional server, running on the one or more processors, the transactional server being operate to:
store the first spin count as a last good spin count;
obtain a first spin failure rate for the first tuning period, wherein a first spin failure comprises a process of the plurality of processes failing to obtain a lock after performing the first maximum number of rounds of the TAS operations that are allowed to the process during the first tuning period;
adaptively configure the second spin count for the second tuning period after the first tuning period based on the obtained first spin failure rate wherein the second spin count is different than the last good spin count;
obtain a second spin failure rate for the second tuning period, wherein a second spin failure comprises a process of the plurality of processes failing to obtain a lock after performing the second maximum number of rounds of the TAS operations that are allowed to the process during the second tuning period;
selectively configure a next spin count for a next tuning period after the second tuning period to be the second spin count and storing the second spin count as the last good spin count responsive to the second spin failure rate being less than the first spin failure rate;
selectively configure the spin count for the next tuning period after the second tuning period to be the last good spin count responsive to the second spin failure rate being greater than the first spin failure rate.

12. The system of claim 11, wherein:
an assembly component is used to perform said TAS operations.

13. The system of claim 11, wherein:
the first spin count is preconfigured using metadata.

14. The system of claim 11, wherein:
the managing component operates to determine whether an idle CPU rate for the first tuning period is more than a user-configured minimum idle CPU rate and whether the first spin failure rate for the first tuning period meets a user-configured target.

15. The system of claim 14, wherein:
when the idle CPU rate for the first tuning period is more than the user-configured minimum idle CPU rate and the first spin failure rate for the first tuning period does not meet the user-configured target, the managing component operates to increase the first spin count to the second spin count:
if the first spin failure rate for the first tuning period is better than a last good spin failure rate, or
if the first spin failure rate for the first tuning period becomes worse without tuning.

16. The system of claim 15, wherein:
a range for possible second spin count values is divided into several intervals, and the managing component operates to use a different formula to calculate a tuned spin count value in each different interval.

17. The system of claim 11, wherein:
the managing component operates to decrease the first spin count to the second spin count, if at least one of:
an application is idle,
an idle CPU ratio is less than a user-configured minimum idle CPU rate and a user CPU ratio is sufficient, and
the first spin count has been kept stable for a predetermined period of time.

18. The system of claim 11, wherein:
the managing component operates to keep the first spin count as the second spin count, if at least one of:
the second spin failure rate for the second tuning period meets a predetermined requirement,
the second spin count for the second tuning period reaches a predetermined top or bottom spin count limitation, and
the second spin failure rate for the second tuning period is stable.

19. The system of claim 11, wherein:
the managing component operates to
put a first process of the plurality of processes with a spin failure to wait in a semaphore waiting queue for a release of a lock on the data in the shared memory;
access the data in the shared memory by the first process, when a lock owner releases the lock on the data; and
apply extra spin counts on the processes performing the TAS operation, when the semaphore waiting queue is not empty.

20. A non-transitory machine readable storage medium having instructions stored thereon that when executed cause a system to perform steps comprising:
monitoring performing, via each process of a plurality of processes during a first tuning period and using a first spin count, test-and-set (TAS) operations in order to obtain locks for data in a shared memory, wherein the first spin count specifies a first maximum number of rounds of the TAS operations that are allowed to each process of the plurality of processes during the first tuning period;
storing the first spin count as a last good spin count;
obtaining a first spin failure rate for the first tuning period, wherein a first spin failure comprises a process of the plurality of processes failing to obtain the a lock after performing the first maximum number of rounds of the TAS operations that are allowed to the process during the first tuning period;
adaptively configuring a second spin count for a second tuning period after the first tuning period based on the obtained first spin failure rate, wherein the second spin count is different than the last good spin count and specifies a second maximum number of rounds of the TAS operations that are allowed to each process of the plurality of processes during the second tuning period;
monitoring performing, via each process of the plurality of processes during the second tuning period and using the second spin count, the TAS operations in order to obtain locks for the data in the shared memory;
obtaining a second spin failure rate for the second tuning period, wherein a second spin failure comprises a process of the plurality of processes failing to obtain a lock after performing the second maximum number of rounds of the TAS operations that are allowed to the process during the second tuning period;

selectively configuring a next spin count for a next tuning period after the second tuning period to be the second spin count and storing the second spin count as the last good spin count responsive to the second spin failure rate being less than the first spin failure rate;

selectively configuring the next spin count for the next tuning period after the second tuning period to be the last good spin count responsive to the second spin failure rate being greater than the first spin failure rate.

\* \* \* \* \*

UNITED STATES PATENT AND TRADEMARK OFFICE
CERTIFICATE OF CORRECTION

PATENT NO. : 9,846,603 B2
APPLICATION NO. : 14/309328
DATED : December 19, 2017
INVENTOR(S) : Shen et al.

Page 1 of 1

It is certified that error appears in the above-identified patent and that said Letters Patent is hereby corrected as shown below:

In the Drawings

On sheet 5 of 8, in FIGURE 5, under Reference Numeral 503, Line 1, delete "countis" and insert -- count is --, therefor.

On sheet 5 of 8, in FIGURE 5, under Reference Numeral 503, Line 2, delete "unchnaged" and insert -- unchanged --, therefor.

On sheet 6 of 8, in FIGURE 6, under Reference Numeral 604, Line 2, delete "spint" and insert -- spin --, therefor.

In the Specification

In Column 8, Line 30, delete "Tuned" and insert -- tuned --, therefor.

Signed and Sealed this
Twenty-first Day of August, 2018

Andrei Iancu
*Director of the United States Patent and Trademark Office*